UNITED STATES PATENT OFFICE.

GEORGE T. LEWIS, OF PHILADELPHIA, PENNSYLVANIA.

IMPROVEMENT IN GRINDING PHOSPHATE SUBSTANCES.

Specification forming part of Letters Patent No. 114,693, dated May 9, 1871.

*To all whom it may concern:*

Be it known that I, GEORGE T. LEWIS, of the city and county of Philadelphia, in the State of Pennsylvania, have invented a new and useful Process for Grinding Phosphatic Substances, and especially mineral phosphates; and I do hereby declare the following to be a full, clear, and exact description thereof, which will enable others skilled in the art to which it appertains to practice my invention.

Phosphatic substances have heretofore been ground in a dry state, but I have found that by grinding them with water the operation will be more perfectly and easily effected; and the nature of my invention consists in grinding these substances with water, as hereinafter described, so as to reduce them to a state of extremely fine division, in which condition they are easily dissolved, and are most fit to be used as fertilizers.

Any suitable apparatus may be employed to carry out this invention. A hollow cylinder mounted on bearings in the line of its axis, and revolved by any power, will answer the purpose. The cylinder is partially filled with the phosphate to be ground, water is introduced, the cylinder is then revolved, and the phosphate ground by the attrition of its particles upon each other.

What I claim as new, and desire to secure by Letters Patent of the United States, is—

The process of grinding phosphatic substances in the presence of water, as above described.

GEORGE T. LEWIS.

Witnesses:
J. M. COLGAN,
D. M. GAZLUY.